Oct. 11, 1927.

W. S. BOWEN 1,645,088

GOVERNOR FOR ROTATING MECHANISMS

Filed Jan. 7, 1927

INVENTOR
William Spencer Bowen
BY
ATTORNEY

Oct. 11, 1927.  
W. S. BOWEN  
1,645,088  
GOVERNOR FOR ROTATING MECHANISMS  
Filed Jan. 7, 1927  2 Sheets-Sheet 2
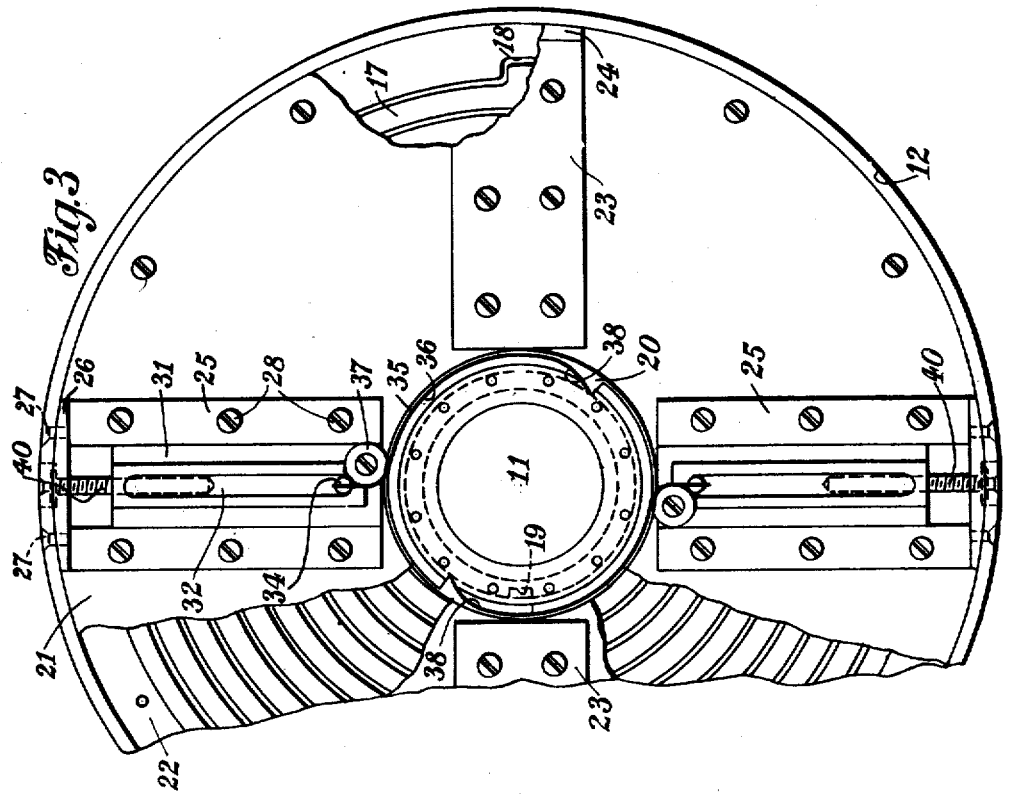
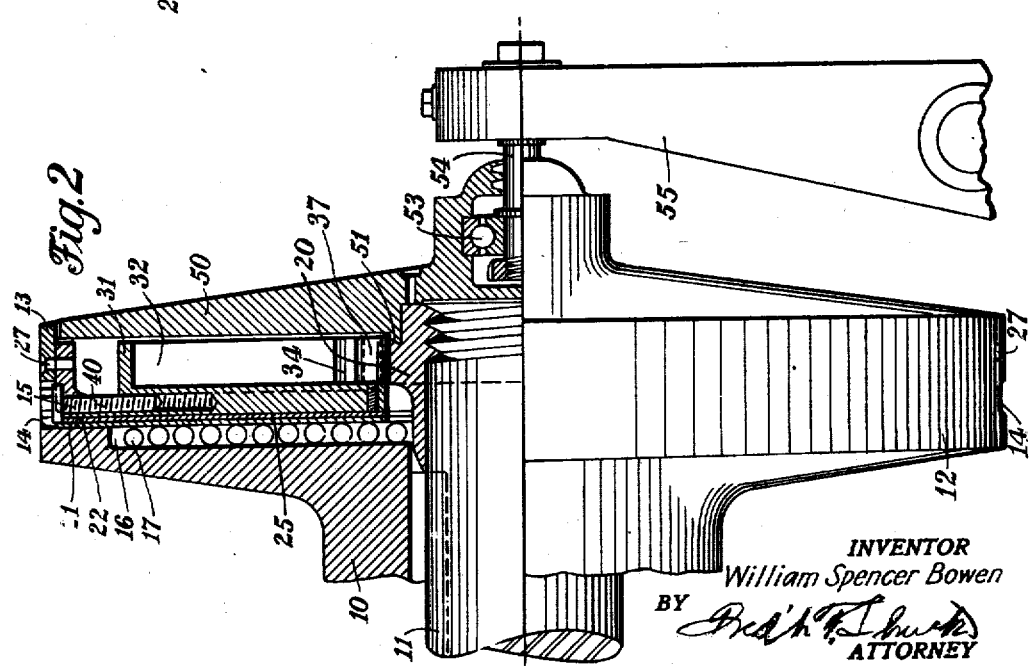
INVENTOR  
*William Spencer Bowen*  
BY  
ATTORNEY Patented Oct. 11, 1927.

1,645,088

UNITED STATES PATENT OFFICE.

WILLIAM SPENCER BOWEN, OF WESTFIELD, NEW JERSEY.

GOVERNOR FOR ROTATING MECHANISMS.

Application filed January 7, 1927. Serial No. 159,722.

The invention relates to a governor for rotating mechanisms, more especially those rotating at comparatively high velocities, and whereby selected speeds thereof may be held substantially constant. It has for its object to provide a governor which shall be simple and comparatively inexpensive to manufacture and of a substantial and rugged construction. A further object of the invention resides in a governor which shall be relatively sensitive to slight variations in speed and wherein the governing mechanism may be readily set or adjusted for different predetermined speeds.

To this end, the novel governor comprises centrifugal elements which are arranged to be counteracted by a suitable tension member, the degree of counteracting force thereof increasing automatically and correspondingly with the increased speed of the mechanism to be governed, special provision being made, however, for varying the degree of this counteracting force.

The nature of the invention, however, will best be understood when described in connection with the accompanying drawings, in which:—

Fig. 2 is a part front elevation and vertical section through the governor.

Fig. 3 is an end view with the inertia member removed and other portions of the governor member broken away.

Figure 1:
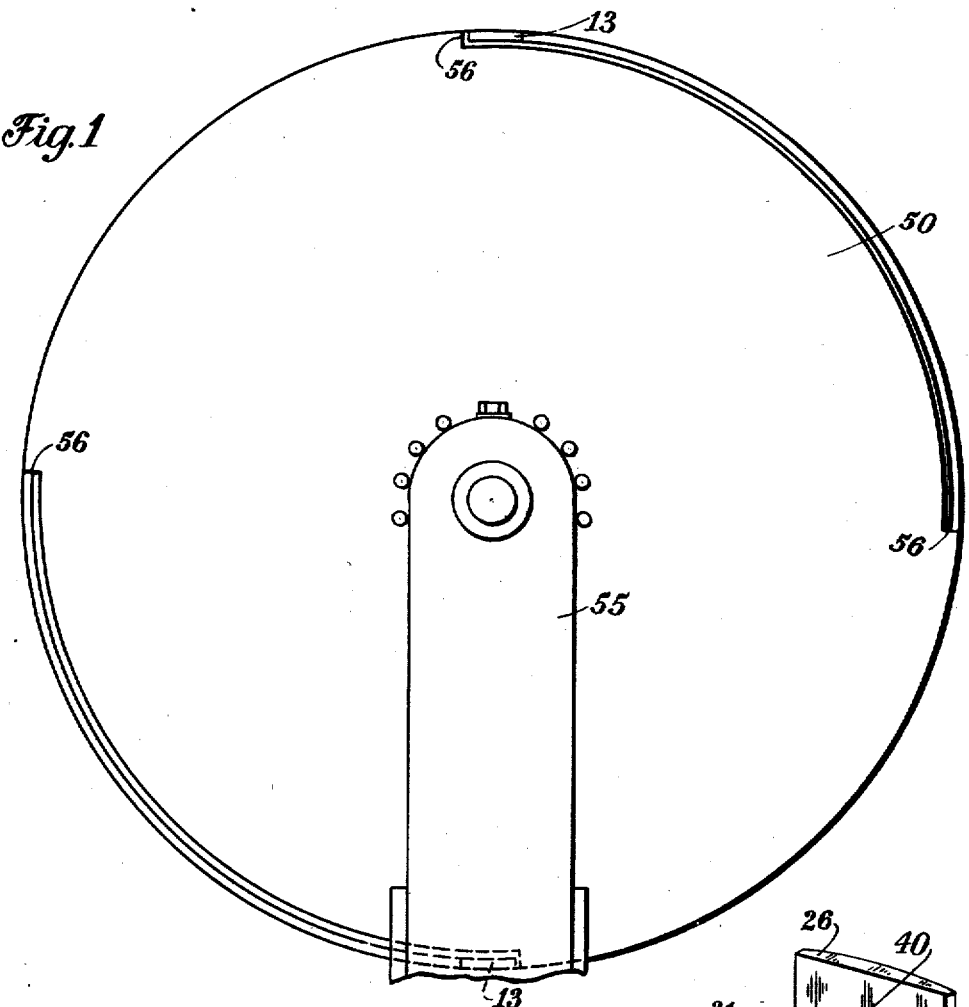
Fig. 1 is an end elevation of the novel governing device and portion of control linkage connected therewith.

Referring to the drawings, 10 designates a suitable hub which is keyed to the end or intermediate portion of a shaft 11 for rotation therewith; and said hub is porvided with a peripheral rim 12 having two diametrically opposed raised portions or stops 13 and beneath which in said rim are provided openings 14 adapted to accommodate the head of an adjustment screw 15. The hub 10 is provided upon its inner face with an annular recess 16 in which is mounted a spiral spring 17, the one end of said spring being held to the hub as by fitting in a notch 18 thereof, while its other end fits into a corresponding notch 19 of an oscillatable member or nut 20. The latter is located, for example, over the threaded end of the shaft 11 to oscillate freely relatively to said hub 10 except as constrained by the spring 17; and in view of the threaded engagement will move outwardly and inwardly on said shaft end in accordance with the direction of its oscillation thereon. An annular retaining plate 21 is placed over the spring 17 and is suitably secured to the inner face 22 of the hub 10.

A pair of diametrically disposed blocks or plates 23, having an outer upstanding wall 24 conforming to the rim 12 and contacting with the inner face thereof, is secured to the said plate 21 to reinforce the same. Equidistantly between the said plates 23 and diametrically disposed on the plate 21 is a pair of guide blocks 25 with outer upstanding wall portion 26 conforming to the rim 12, said upstanding portion abutting the inner wall of said rim and being rigidly secured thereto by screws 27 as well as to the plate 21 by screws 28. The side walls of the blocks 25 are undercut to provide angular ways 30 in which is designed to reciprocate a slider member 31. The said member, furthermore, is provided with an upstanding radial guideway 32 having an inner end stop 33 and in which guideway is mounted for reciprocation a cylinder or pin 34 constituting centrifugal weights. The latter is securely attached to one end of a steel tape 35 which is wrapped over substantially a quadrant of the periphery 36 of the oscillatable nut, said tape passing over an intermediate idler roller 37 mounted on the slider block 31.

The periphery 36 of the oscillatable nut at diametrically opposed points is transversely grooved to receive the other end of the tape 35 which is fixed thereto as by soldering or welding the same therein; and the immediately adjacent surface of this peripheral portion of the nut is of reduced diameter to afford a cam surface 38 over which the said tape is wrapped, the said cam surface gradually merging into the normal peripheral surface. It is to be understood that the application of the tapes 35 to the periphery of the oscillatable nut is such that a couple will be developed as the cylinders or pins 34 are drawn outwardly under the action of centrifugal force, thus tending to rotate the said nut in opposition to the tension exerted thereon by the coil spring 17, tending to wind up the latter.

In order positively to limit the extent of radial outward movement of the cylindrical members or pins 34—which, it will be understood, results from the centrifugal force developed in the said pins 34 under the rotational velocity imparted to the hub 10 from shaft 11—adjustable screws 40 passing freely through the rim 12 and upstanding wall 26 of a guide block 25 are screwed into a slider block 31 and move a said block to locate the outer end of its guideway 32. These screws at the same time regulate or serve to set the tension of the coil spring 17 according to the degree of angular movement of the oscillatable nut to which it is connected.

Figure 5:
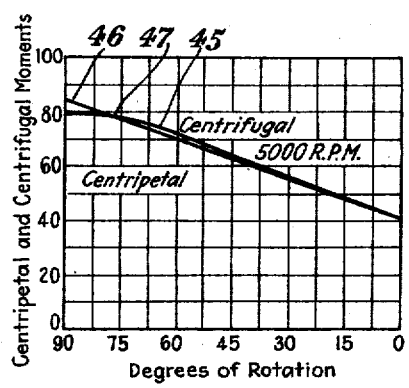
Fig. 5 is a governor diagram illustrating the action of the governing mechanism.
Figure 4:
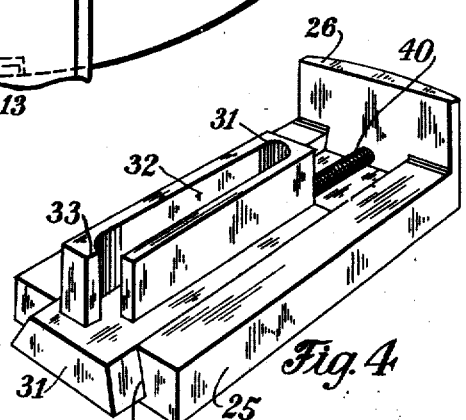
Fig. 4 is a perspective view of a guide block and associated slider member.

It will be understood that the rotational velocity effect on these cylindrical members is proportional to the centrifugal force exerted thereon and is thus a straight-line function, as indicated by the line 45, Fig. 5 of the drawings, while the counteracting tension of the spring 17 is thereby correspondingly increased through the rotation of the oscillatable nut affected thereby. This tension of the spring is also a straight-line function, line 46, Fig. 5; but it will be appreciated that the former force increases faster than the latter; and to this end, the cam surfaces 38 are provided so that as the angular position of the nut changes through the increased force applied through the tapes, the actual torque applied to the spring is reduced in proportion to the design of the cam surface due to the reduced effective radius. At the desired rotational velocity, the two forces balance as indicated at the point 47 and the rotation is held substantially constant.

In order to accommodate sudden or abrupt changes in speed, an inertia member 50 in the nature of a weighted plate may be secured to the outer end of the nut 20 which for this purpose is provided with the undercut portion 51; and, furthermore, the central outer portion of the plate 50 may be provided with a combination thrust and journal bearing or a similar means 53 for receiving a reciprocable rod 54 of the control linkage 55 and whereby the driving power for the shaft 11 is actuated and controlled in manner well understood. The circumference of the plate 50 is of reduced diameter at diametrically opposed portions over an arc of approximately 96° in order to permit a swing of the nut through a complete quadrant. The resulting shoulders 56 afforded thereby are adapted to contact with the projections 13 (which subtend an arc of 6°) under sudden variations in load as the said plate swings in one direction or the other and form limiting stops therefor.

I claim:

1. A governor for rotating mechanisms, comprising a rotatable shaft with threaded portion, an oscillatable member mounted over said threaded portion and rotatable thereon, resilient means connecting the shaft with the oscillatable member, and centrifugal members connected with the oscillatable member to apply a couple thereto when the said shaft is rotated.

2. A governor for rotating mechanisms, comprising a rotatable shaft with threaded portion, an oscillatable member mounted over said threaded portion, resilient means connecting the shaft with the oscillatable member, centrifugal members carried by the shaft, and a pair of spring-metal tapes wrapped about the oscillatable member and adapted to wind thereon, said tapes also connecting the centrifugal members with the oscillatable member to apply a couple thereto when the said shaft is rotated.

3. A governor for rotating mechanisms, comprising a rotatable shaft with threaded portion, an oscillatable member mounted over said threaded portion, rotatable thereon and provided with diametrically disposed peripheral cam surfaces, centrifugal members carried by the shaft, a pair of spring-metal tapes secured thereto and to the oscillatable member at diametrically opposite points and wrapped over the said cam surfaces thereof to apply a couple of varying torque to the oscillatable member in accordance with the rotational velocity of the said shaft.

4. A governor for rotating mechanisms, comprising a rotatable shaft with threaded portion, an oscillatable member mounted over said threaded portion, resilient means connecting the shaft with the oscillatable member, centrifugal members carried by the shaft, a pair of spring-metal tapes connecting the centrifugal members with the oscillatable member to apply a couple thereto when the said shaft is rotated, and means to adjust said centrifugal members radially to set thereby the tension of the resilient means.

5. A governor for rotating mechanisms, comprising a rotatable shaft with threaded portion, an oscillatable member mounted over said threaded portion and rotatable thereon, resilient means connecting the shaft with the oscillatable member, centrifugal members carried by the shaft, a pair of spring-metal tapes connecting the centrifugal members with the oscillatable member to apply a couple thereto when the said shaft is rotated, an inertia member secured to the oscillatable member, and actuating means moved thereby.

6. A governor for rotating mechanisms, comprising a rotatable shaft with threaded portion, an oscillatable member mounted over said threaded portion, a hub rotatable with the shaft, a coiled spring mounted therein and connecting the said hub with the oscillatable member, diametrically disposed guide blocks with lateral ways and secured to the hub member, slider members radially adjustable in said ways and each provided with a radial guideway, a pair of weights movable in the respective radial guideways of the slider members to apply a couple to the oscillatable member when the shaft is rotated, spring-metal tapes secured to said weights and to the periphery of said oscillatable member, and an intermediate idler roller for a tape and secured to a corresponding guide block.

7. A governor for rotating mechanisms comprising a rotatable shaft with threaded portion, a hub secured thereto for rotation therewith, provided with a recess and having an upstanding rim with a pair of diametrically disposed projections extending outwardly therefrom, an oscillatable nut mounted over the threaded portion of said shaft within the hub, a coil spring mounted in the hub recess and having one end secured to the hub, an annular plate secured to the hub fitting about the oscillatable member and covering said coil spring, a pair of guide blocks diametrically secured on said plate and to the rim of said hub, slider members radially movable in said guide blocks, adjusting screws passing through the rim of the hub and a corresponding guide block and secured to the slider member thereof, said slider members being provided with radial guideways having an inner stop, weights movable in the respective radial guideways to apply a couple to the oscillatable nut when the shaft is rotated, a pair of spring-metal tapes having one of their ends secured to the respective weights and the other ends to the periphery of said nut at diametrically opposite points and the periphery of said nut at the immediate points of attachment of the tapes being of reduced and varying radius, and an inertia plate mounted over the guide blocks, secured to the said oscillatable member and having quadrants of reduced radius to clear the projecting stops of the rim portion of the hub and affording shoulders for engagement therewith.

8. A governor for rotating mechanisms, comprising a rotatable shaft with threaded portion, an oscillatable member mounted over said threaded portion and rotatable thereon, resilient means connecting the shaft with the oscillatable member, centrifugal members connected with the oscillatable member to apply a couple thereto when the said shaft is rotated, and means to conform the movement of said centrifugal members to a direction substantially radial with respect to the shaft axis.

9. A governor for rotating mechanisms, comprising a rotatable shaft with threaded portion, an oscillatable member mounted over said threaded portion, resilient means connecting the shaft with the oscillatable member, centrifugal members carried by the shaft, a pair of spring-metal tapes wrapped about the oscillatable member and adapted to wind thereon, said tapes also connecting the centrifugal members with the oscillatable member to apply a couple thereto when the said shaft is rotated, and blocks having radially disposed ways wherein said centrifugal members are adapted to reciprocate.

In testimony whereof I affix my signature.

WILLIAM SPENCER BOWEN.